Oct. 4, 1949.                E. C. JOHNSON                 2,483,545
                         WELDING TORCH ATTACHMENT
                           Filed Oct. 7, 1947
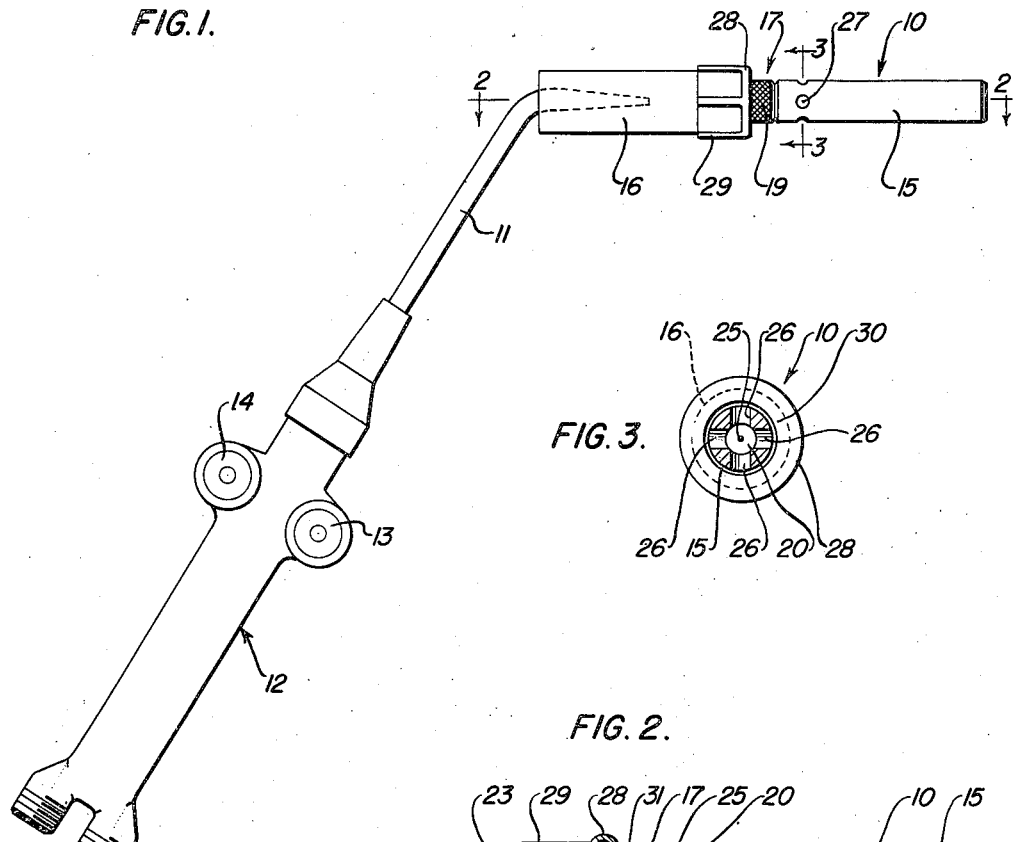
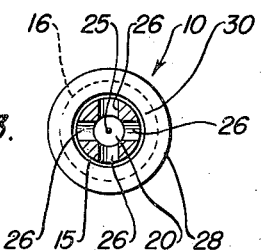
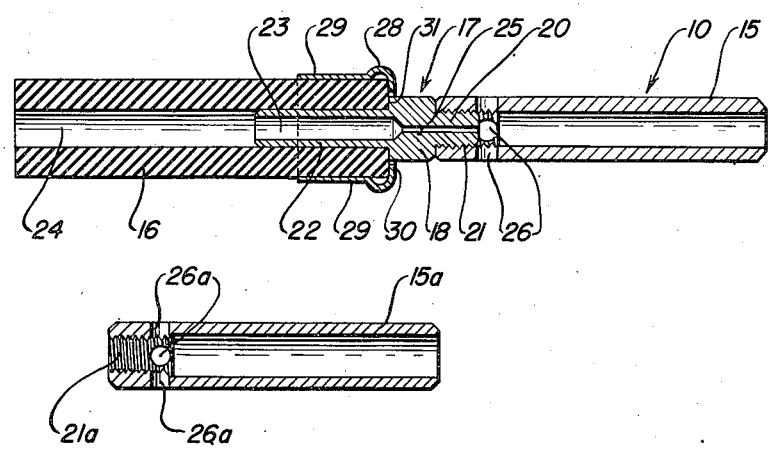
INVENTOR.
Everett C. Johnson
BY
Wallace and Cannon
Attorneys Patented Oct. 4, 1949

2,483,545

UNITED STATES PATENT OFFICE 2,483,545

WELDING TORCH ATTACHMENT

Everett C. Johnson, Chicago, Ill.

Application October 7, 1947, Serial No. 778,507

10 Claims. (Cl. 158—27.4)

This invention relates to a welding torch attachment in the form of a soldering tip adapted to be attached to the tip or nozzle of an oxy-acetylene welding torch so as to enable the thus connected welding torch to be used for body-soldering of automobiles, tinning, silver-soldering and the like.

The primary object of the invention is to provide a novel welding torch attachment or soldering tip which may be readily attached to the tip or nozzle of an oxy-acetylene welding torch so as to enable the thus connected welding torch nozzle or tip to be used for body-soldering of automobiles, tinning, silver-soldering and the like.

An additional object of the invention is to construct the new welding torch attachment or soldering tip, and the component parts thereof, in such a manner that the new welding torch attachment may be readily adapted to provide either a brush type of flame or a bulbous type of flame, as may be desired.

A further object of the invention is to construct the new welding torch attachment or soldering tip in such a manner that the same may be readily adjusted to provide either a brush type of flame or a bulbous type of flame, burning only acetylene gas fed from the torch nozzle or tip into and through the new welding torch attachment or tip, or a substantially hotter flame which may be employed for brazing or pre-heating of metals and which utilizes both acetylene gas and some oxygen fed from the welding torch nozzle or tip into and through the new welding torch attachment or soldering tip, in addition to the air supplied to the new welding torch attachment or tip through the air ports in the burner tube.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is an elevational view illustrating a preferred embodiment of the new welding torch attachment or soldering tip applied to the nozzle or tip of a conventional acetylene welding torch;

Fig. 2 is an enlarged central longitudinal sectional view on line 2—2 in Fig. 1 illustrating the construction of the new welding torch attachment or soldering tip and showing the same as embodying a relatively small diameter burner tube adapted to afford a brush type of flame when the new welding torch attachment or soldering tip is in position of use upon the nozzle or tip of a conventional oxy-acetylene welding torch, as in Fig. 1;

Fig. 3 is an enlarged transverse sectional view on line 4—4 in Fig. 1; and

Fig. 4 is a central longitudinal sectional view illustrating an outlet or burner tube of somewhat larger diameter than the burner tube illustrated in Fig. 2 and which may be substituted upon the supporting stem of the new welding torch attachment or soldering tip, in place of the relatively small diameter burner tube shown in Fig. 2, so as to afford a bulbous type of flame in place of the brush type of flame which is afforded by the burner tube of relatively smaller diameter shown in Figs. 1, 2 and 3, of the drawings.

A preferred embodiment of the new welding torch attachment or soldering tip is illustrated in the drawing, wherein it is generally indicated at 10, and is shown as detachably mounted upon or applied to the nozzle or tip 11 of a conventional oxy-acetylene welding torch unit, which is generally indicated at 12, and which includes manually operable control valves 13 and 14.

The new welding torch attachment or soldering tip 10 includes a burner tube 15 which may be made of any suitable metal such, for example, as brass; a flexible fitting 16 which may be made of natural or so-called synthetic rubber, or suitable flexible plastic or like flexible material, and an intermediate and interconnecting part or member 17 which may be made of any suitable metal such, for example, as brass.

The intermediate and interconnecting member 17 includes a main and centrally arranged body portion 18 which is preferably provided with a knurled peripheral edge surface 19 (Fig. 1) to facilitate handling thereof. The intermediate and interconnecting member 17 also includes a forwardly extending attaching portion or stem 20, which is somewhat smaller in diameter than the main and centrally arranged body portion 18. This attaching portion or stem 20 is externally threaded, as at 21, for the reception of the internally threaded rear end portion of the burner tube 15 (Fig. 2). The intermediate and interconnecting member 18 also embodies a tubular attaching portion or stem 22 which extends rearwardly of the main and centrally arranged body portion 18. This rearwardly extending attaching portion or stem 22 has a centrally arranged and longitudinally extending passage 23 formed therein. The front end portion of the flexible rubber fitting 16 is slipped over and frictionally fitted onto the tubular rearwardly extending attaching portion or stem 22 of the intermediate and interconnecting member 18 so that the central passage 23 in the rearwardly extending attaching portion or stem 22 of the intermediate and interconnecting member 22 communicates with the central longitudinally extending passage 24 which is formed in the flexible rubber fitting 16.

As shown in Fig. 2, a centrally arranged and longitudinally extending passage 25 is formed in and extends through the main and centrally arranged body portion 18 of the intermediate and interconnecting member 17 and through the forwardly extending attaching portion or stem 25. The passage 25 is of reduced diameter compared to the diameter of the central passage 23 in the rearwardly extending attaching portion or stem 22.

The inner end portion of the burner tube 15 has a plurality of air inlet ports 27 formed in the wall thereof and arranged at spaced intervals radially therearound and these air inlet ports 26 communicate with the interior of the burner tube 15.

A metallic ferrule or reinforcing collar 28 is pressed upon the outer surface of the front end portion of the flexible or rubber fitting 16. This metallic ferrule or reinforcing collar 28 has a plurality of parallel reinforcing or strengthening ribs 29 formed integral therewith. The metallic ferrule or collar 26 also has a substantially annular flange 30 formed therein at the front end thereof and this substantially annular flange 30 extends down inwardly over and is pressed into gripping engagement with the front wall 31 of the flexible or rubber fitting 16, as shown in Fig. 2.

In the use of the new welding torch attachment or soldering tip shown in Figs. 1 to 3, inclusive, of the drawings, the intermediate and interconnecting member 17 and the flexible or rubber fitting 16 may be assembled in the manner shown, and as hereinbefore described. The flexible or rubber fitting 16 may then be slipped over and into frictional engagement with the outer end portion of the nozzle or tip 11 of the welding torch 12, as shown in Fig. 1. The internally threaded rear end portion of the burner tube 15 may then be screwed onto the externally threaded stem or forwardly extending attaching portion or stem 20 of the intermediate and interconnecting member 17, so that the parts will be assembled in the relative positions in which they are shown in Figs. 1, 2 and 3 of the drawing. The manually operable acetylene control valve 16 may then be opened, whereupon acetylene gas will flow through the central internal passage 24 in the flexible or rubber fitting 16, through the central passage 23 in the rearwardly extending attaching portion or stem 22 of the intermediate or interconnecting member 17 and thence through the central passage 25 therein into the burner tube 15.

As the acetylene gas thus flows out of the relatively small diameter central passage 25 in the intermediate and interconnecting member 17 and into the burner tube 15 it is mixed with the air entering the burner tube 15 by way of the air ports 26, whereupon the thus formed acetylene-air mixture may be ignited at the outlet end of the burner tube 15. When the thus formed acetylene-air mixture is ignited and burns at the outer end of the burner tube 15 it forms a brush type of flame which may be employed for so-called light soldering of jewelry, tinning, silver-soldering, and the like.

The main extend of the burner tube 15a which is shown in Fig. 4 is of somewhat larger internal diameter than the burner tube shown in Figs. 1, 2 and 3 but the internally threaded rear end portion 21a thereof is the same diameter as the internally threaded rear end portion 21 of the burner tube 15 so that the burner tube 15 may be detachably threaded onto the externally threaded attaching portion or stem 20 of the intermediate and interconnecting member 17.

Since the burner tube 15a shown in Fig. 4 is otherwise identical in design and construction to the burner tube 15 the parts thereof have been given similar reference numerals followed by the additional and distinguishing reference character "a."

In the use of the new welding torch attachment the tube 15 may be unscrewed from position of use upon the externally threaded attaching portion or stem 20 of the intermediate and interconnecting member 17 and the relatively larger diameter burner tube 15a screwed thereon. When thus mounted in position of use the burner tube 15a will afford a bulbous type of flame which may be employed for soldering automobile car bodies and in like instances in which such a bulbous type of flame may be employed.

If desired, the manually operable control valve 14 for the oxygen supply of the welding torch 12 may be partially opened so as to mix a relatively small volume or proportion of oxygen with the acetylene which is being supplied through the torch tip 11 to the new welding torch attachment 10 so as to provide a substantially hotter flame at the outlet end of the burner tube 15 or 15a than is provided when only air entering the burner tube 15 by way of the air inlet ports 26 is mixed with the acetylene therein. This hotter type of flame afforded by the oxygen-acetylene-air mixture may be employed for the brazing or pre-heating of metals, or for like purposes.

It will thus be seen that the present invention provides a new and improved welding torch attachment or soldering tip which has the desirable advantages and characteristics, and which accomplishes its intended objects, including those hereinbefore pointed out, and others which are inherent in the invention.

I claim:

1. A welding torch attachment comprising a flexible tubular fitting adapted to be detachably attached to the tip of a welding torch, a burner tube having an air inlet port therein, and an intermediate and interconnecting member disposed between and interconnected to the said flexible tubular fitting and to the said burner tube, the said intermediate and interconnecting member having a centrally arranged gas-conducting passage formed therein and having means cooperating with the said burner tube for detachably mounting the said burner tube thereon, the said centrally arranged gas-conducting passage in the said intermediate and interconnecting member opening into the said burner tube adjacent the said air inlet port therein when the said burner tube is assembled in position of use upon the said intermediate and interconnecting member.

2. A welding torch attachment as defined in claim 1 in which the said means on the said intermediate and interconnecting member cooperating with the said burner tube for detachably mounting the said burner tube on the said intermediate and interconnecting member is comprised of an externally threaded forwardly extending attaching portion or stem formed on the said intermediate and interconnecting member and in which the said burner tube has an internally threaded inner end portion which is adapted to be detachably threaded onto the said externally threaded forwardly extending attaching portion or stem of the said intermediate and interconnecting member.

3. A welding torch attachment as defined in claim 1 in which the said means on the said intermediate and interconnecting member cooperating with the said burner tube for detachably mounting the said burner tube on the said intermediate and interconnecting member is comprised of an externally threaded forwardly extending attaching portion or stem formed on the said intermediate and interconnecting member and in which the said burner tube has an internally threaded inner end portion which is adapted to be detachably threaded onto the said externally threaded forwardly extending attaching portion or stem of the said intermediate and interconnecting member, and in which the said intermediate and interconnecting member includes a main central body portion disposed rearwardly of the said burner tube and the said flexible tubular fitting, and in which the said centrally arranged gas-conducting passage extends through the said main body portion of the said intermediate and interconnecting member and through the said forwardly extending externally threaded attaching portion or stem thereon.

4. A welding torch attachment as defined in claim 1 in which the said means on the said intermediate and interconnecting member cooperating with the said burner tube for detachably mounting the said burner tube on the said intermediate and interconnecting member is comprised of an externally threaded forwardly extending attaching portion or stem formed on the said intermediate and interconnecting member and in which the said burner tube has an internally threaded inner end portion which is adapted to be detachably threaded onto the said externally threaded forwardly extending attaching portion or stem of the said intermediate and interconnecting member, and in which the said intermediate and interconnecting member includes a main central body portion disposed rearwardly of the said burner tube and the said flexible tubular fitting, and in which the said centrally arranged gas-conducting passage extends through the said main body portion of the said intermediate and interconnecting member and through the said forwardly extending externally threaded attaching portion or stem thereon, and in which the said burner tube has a plurality of radially arranged air inlet ports formed in the inner end portion thereof and opening into the interior thereof adjacent the axially inner end of the said centrally arranged gas-conducting passage in the said intermediate and interconnecting member.

5. A welding torch attachment as defined in claim 1 in which the said means on the said intermediate and interconnecting member cooperating with the said burner tube for detachably mounting the said burner tube on the said intermediate and interconnecting member is comprised of an externally threaded forwardly extending attaching portion or stem formed on the said intermediate and interconnecting member and in which the said burner tube has an internally threaded inner end portion which is adapted to be detachably threaded onto the said externally threaded forwardly extending attaching portion or stem of the said intermediate and interconnecting member, and in which the said intermediate and interconnecting member includes a main central body portion disposed rearwardly of the said burner tube and the said flexible tubular fitting, and in which the said centrally arranged gas-conducting passage extends through the said main body portion of the said intermediate and interconnecting member and through the said forwardly extending externally threaded attaching portion or stem thereon, and in which the said burner tube has a plurality of radially arranged air inlet ports formed in the inner end portion thereof and opening into the interior thereof adjacent the axially inner end of the said centrally arranged gas-conducting passage in the said intermediate and interconnecting member, and in which the said intermediate and interconnecting member includes a rearwardly extending tubular attaching portion or stem which extends into the interior of the said flexible tubular fitting and has the said flexible tubular fitting frictionally fitted thereon.

6. A welding torch attachment comprising a flexible tubular fitting adapted to be detachably attached to the tip of a welding torch, a burner tube having an air inlet port therein, and an intermediate and interconnecting member disposed between and interconnected to the said flexible tubular fitting and to the said burner tube, the said intermediate and interconnecting member having a centrally arranged gas-conducting passage formed therein and having means cooperating with the said burner tube for detachably mounting the said burner tube thereon, the said centrally arranged gas-conducting passage in the said intermediate and interconnecting member opening into the said burner tube adjacent the said air inlet port therein when the said burner tube is assembled in position of use upon the said intermediate and interconnecting member.

7. A welding torch attachment as defined in claim 6 in which the said means on the said intermediate and interconnecting means cooperating with the said burner tube for detachably mounting the said burner tube on the said intermediate and interconnecting member is comprised of an externally threaded forwardly extending attaching portion or stem formed on the said intermediate and interconnecting member and in which the said burner tube has an internally threaded inner end portion which is adapted to be detachably threaded onto the said externally threaded forwardly extending attaching portion or stem of the said intermediate and interconnecting member.

8. A welding torch attachment as defined in claim 6 in which the said intermediate and interconnecting member includes a main central body portion disposed rearwardly of the said burner tube and the said flexible tubular fitting, and in which the said centrally arranged gas-conducting passage extends through the said main body portion of the said intermediate and interconnecting member and through the said forwardly extending externally threaded attaching portion or stem thereon.

9. A welding torch attachment as defined in claim 6 in which the said burner tube has a plurality of radially arranged air inlet ports formed in the inner end portion thereof and opening into the interior thereof adjacent the axially inner end of the said centrally arranged gas-conducting passage in the said intermediate and interconnecting member.

10. A welding torch attachment as defined in claim 6 in which the said intermediate and interconnecting member includes a rearwardly extending tubular attaching portion or stem which extends into the interior of the said flexible tubular fitting and has the said flexible tubular fitting frictionally fitted thereon.

EVERETT C. JOHNSON.

REFERENCES CITED

The following references are of record in the file of this patent:

UNITED STATES PATENTS

| Number | Name | Date |
| --- | --- | --- |
| 1,702,731 | Hymer | Feb. 19, 1929 |
| 1,846,743 | Mandeville | Feb. 23, 1932 |

FOREIGN PATENTS

| Number | Country | Date |
| --- | --- | --- |
| 332,055 | Italy | Nov. 22, 1935 |